(12) United States Patent
Jordil et al.

(10) Patent No.: US 7,213,345 B2
(45) Date of Patent: May 8, 2007

(54) MOTORIZED ORIENTABLE MEASURING HEAD

(75) Inventors: Pascal Jordil, Ecoteaux (CH); Claude Rouge, Baulmes (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 11/291,870

(22) Filed: Nov. 30, 2005

(65) Prior Publication Data
US 2006/0130349 A1    Jun. 22, 2006

(30) Foreign Application Priority Data
Dec. 1, 2004   (EP) ................... 04106226
Dec. 15, 2004  (EP) ................... 04106607

(51) Int. Cl.
  *G01B 5/00* (2006.01)
  *G01B 5/20* (2006.01)
(52) U.S. Cl. .......................... 33/559; 33/556
(58) Field of Classification Search ............ 33/559
See application file for complete search history.

(56) References Cited

U.S. PATENT DOCUMENTS

| 5,212,646 | A  | * | 5/1993  | McMurtry ............ 700/161 |
| 5,675,902 | A  | * | 10/1997 | Chase ................. 33/559 |
| 5,979,070 | A  | * | 11/1999 | Lau .................... 33/559 |
| 6,170,358 | B1 |   | 1/2001  | Hunter |
| 6,546,643 | B2 | * | 4/2003  | Lotze et al. .......... 33/559 |
| 2004/0149057 | A1 |   | 8/2004  | Jordil |
| 2006/0196066 | A1 | * | 9/2006  | Lloyd et al. .......... 33/559 |

* cited by examiner

*Primary Examiner*—Christopher W. Fulton
(74) *Attorney, Agent, or Firm*—Pearne & Gordon LLP (57) ABSTRACT

Motorized indexed measuring head for a machine for measuring three-dimensional coordinates. Comprises one, two or more re-orientable elements to orient a probe feeler according to a plurality of indexed orientations. The orientable elements are guided in their rotation and sliding movements by undercut bushings and undercut shafts. The arrangement of the undercuts allows an accurate guiding in the rotation movement without impairing the indexing accuracy.

9 Claims, 8 Drawing Sheets

MOTORIZED ORIENTABLE MEASURING HEAD

REFERENCE DATA

This application claims priority from European patent applications N° 2004EP-106226 filed on Dec. 1, 2004, and N° 2004EP-106607 of Dec. 15, 2004, and the contents whereof are hereby incorporated by reference.

TECHNICAL FIELD

The present invention concerns a re-orientable measuring head for measuring three-dimensional coordinates of a mechanical part and notably, though not exclusively, a re-orientable measuring head designed to be used on a manual or automatic machine for measuring coordinates.

RELATED ART

Touch probes are measuring instruments used for example on production lines of mechanical parts, for checking dimensions or surfaces of machined parts. Touch probes are also used for capturing the three-dimensional shape of complex pieces, in order for example to reproduce or model them.

Probes generally comprise a measuring head, designed to be fastened onto the arm of a measuring machine and a mobile feeler, comprising a sphere at the end of an elongated rod and designed to be brought into contact with the piece to be measured.

In most applications, touch probes are fastened on the mobile arm of a machine whose position in space can be determined accurately by means of a manual or automatic measuring system, such as for example position encoders placed on the axes of the machine. The mobile arm is moved in space to bring the probe's measuring feeler into contact with the piece or surface to be measured. During contact, a deflective force is then applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

In the case of a three-dimensional touch probe, the connection between the feeler and the fixed part of the measuring head is usually realized according to the principle of the Boys connection, i.e. for example by three cylindrical pins resting on six spheres so as to define six contact points between the fixed organ and the feeler. Two- and one-dimensional probes are however also known.

When the probe is used for measuring pieces of complex shape, having cavities and protuberances, it is difficult or even impossible to bring the feeler into contact with the entire surface of the piece without the fixed part of the measuring head or the feeler's rod interfering with elements of the piece to be measured. To remedy this inconvenience, measuring heads are known that allow the contact feeler to be oriented in a plurality of directions in space. Generally, two independent rotation axes are required to cover all the possible orientations. An instrument of this type is described in European patent application EP0392660.

Use of this type of devices is however not limited to contact feelers and they can also be used with probes without contact, for example video cameras, for inspecting and checking machined parts for example.

The rotation axes are preferably indexed, in the sense that a sufficiently large but finite number of predetermined and accurately reproducible resting positions are provided. This arrangement avoids the measuring machine having to be re-calibrated after each change in orientation of the feeler.

The indexing of the feeler's rotation axes is achieved by indexing surfaces that engage mutually and define the desired resting positions, for example by a crown of spheres in which three pins engage. An example of this type of indexing mechanism is presented in European patent application EP1443299 in the name of the applicant. Optimum accuracy is achieved when the indexing surfaces define an isostatic connection with six independent contact points in each of the indexed positions.

For measuring complex pieces, it is desirable that the measuring head be motorized in order to orient the probe feeler automatically, upon command from the measuring machine's control program. For this purpose, the rotating and the locking of the feeler's axes are performed by electromagnetic actuators, for example engines or servomotors that move the indexing surfaces away and imprint a rotation to the axes.

One limitation of the known measuring heads, and particular of motorized measuring heads, is that the re-orientable elements must be guided in their rotation, for example by bearings or balls. These guiding organs, however, constitute additional mechanical constraints compared with the isostatic connection and impair the indexing accuracy. To avoid this inconvenience, the known measuring heads often adopt bearings of small diameter or having considerable tolerances.

The inertia forces linked to the mass of the probe feeler can also influence negatively the functioning of the measuring head, notably if massive feelers and considerable translation and rotation speeds are used. In these conditions, it is important to have efficient bearings or guiding organs for the re-orientable elements of the measuring head.

Without efficient guiding, the rotation speed of the re-orientable elements is necessarily limited. Furthermore, the trajectory of the probe feeler during rotation cannot be determined accurately. It is thus necessary to keep a considerable security distance between the probe feeler and the part to be measured, which increases the head's trajectories and reduces the measuring speed.

DESCRIPTION OF THE INVENTION

One aim of the present invention is to propose a measuring head free of the limitations of the known devices and, notably, a measuring head whose re-orientable elements are guided efficiently, without impairing the indexing accuracy, and wherein the trajectory of the feeler is completely controlled.

These aims are achieved by the device comprising the combination of characteristics that are the object of the main claim, and notably by a re-orientable measuring head for re-orienting a probe feeler relatively to a measuring apparatus comprising: a support element; a first re-orientable element capable of sliding in the direction of a first axis between a locked position and an unlocked position; a first guiding organ connected with said support element; a second guiding organ connected with said first re-orientable element; wherein said first and second guiding organs do not touch when said re-orientable element is in locked position; wherein said first guiding organ supports said second guiding organ so as to allow said re-orientable organ to rotate around said axis relatively to said support element when said re-orientable element is in said unlocked position.

BRIEF DESCRIPTION OF THE DRAWINGS

The present invention will be better understood by reading the description given by way of example and illustrated by the attached figures showing.

EMBODIMENT(S) OF THE INVENTION

Figure 1:
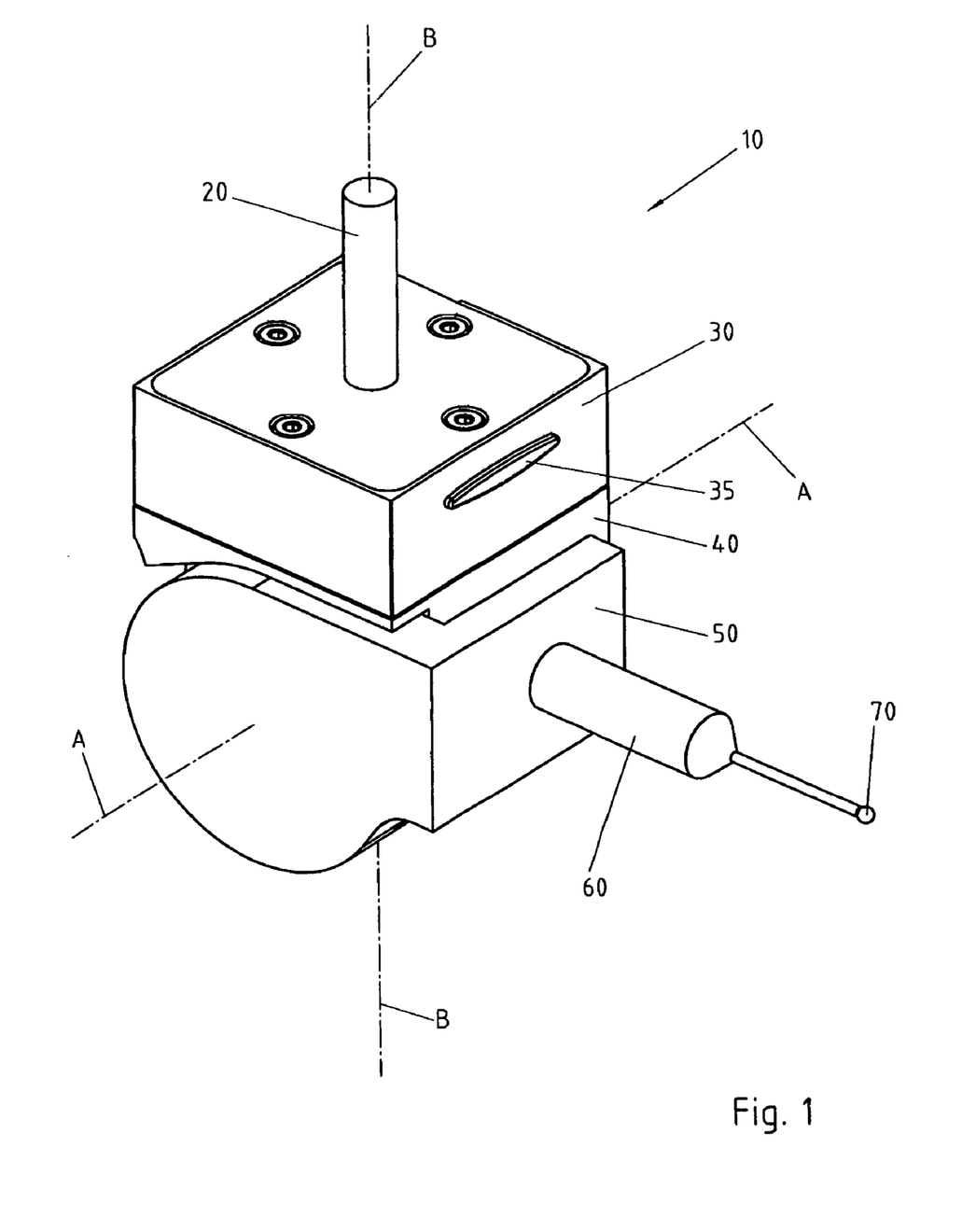
FIG. 1, a view of a motorized measuring head according to the invention.

With reference to FIG. 1, a re-orientable measuring head 10 according to the invention comprises a support 30 designed to be fastened onto the arm of a measuring machine, capable of moving, for example along three axes of coordinates X, Y and Z inside a measuring volume. It can be fastened for example by the rod 20 or by any other fastening means.

Hereinafter, for the sake of simplicity, the designation "vertical" will be used for referring to the orientation of the axis B in FIG. 1. This designation refers to the conventional orientation of the figures and also to the orientation in which the inventive device is normally used and usually coincides with the direction of the vertical axis Z of the measuring machine onto which the probe is mounted. However, the probe can be used with any orientation in space.

A first re-orientable element 40 is fastened to the support 30, so as to be able to turn around the vertical axis B. The first re-orientable element 40 can preferably take up a plurality of indexed positions, corresponding to multiples of a small predetermined angle, for example 10 degrees. In known fashion, these indexed positions are determined for example by an isostatic connection defining six resting points between positioning elements whose position is determined with great accuracy.

The second re-orientable element 50 is free to turn around the horizontal axis A united with the first re-orientable element 40. The rotation of the second re-orientable element 50 around the axis A can be continuous or indexed, motorized or manual, as for the first re-orientable element 40 here above.

A probe feeler 60 is fastened to the second re-orientable element 50 and bears, at its extremity, a sphere 70 designed to come into contact with the piece to be measured. A detection mechanism, not represented, thus responds to the slightest displacement of the sphere 70 relatively to the resting position with an electric signal that is sent either to the light display 35 or to the machine's control software, by a connector (not represented).

The locking and unlocking mechanism of the axes according to one aspect of the invention will now be described with reference to FIGS. 2 and 3.

The support 30 bears a series of balls 31 placed along a circumference with a usually constant angular distance, for example by 10°, so as to define a series of indexed position usually regularly spaced. The first re-orientable element 40 bears, corresponding to the balls 31, three pins 41 at a distance of 120° and capable of engaging with the balls 31. In locked position (FIG. 2), the first re-orientable element 40 is brought, by pulling the rod 66, against the fixed element 30. Each of the pins 41 then touches two adjacent balls 31 so as to have an isostatic connection between the support element 30 and the re-orientable element 40, according to the principle of the Boys connection.

In equivalent manner, in the frame of the present invention, it would be possible to exchange the position of the balls and of the pins, by placing the first on the re-orientable element and the latter on the support element. One could also replace the balls and pins by other positioning elements capable of defining six contact points between the support element 30 and the re-orientable element 40.

One extremity of the vertical rod 66 is fastened in articulated manner to the support element 30 whereas the other extremity of the rod 66 is fastened in articulated manner to one arm of the lever 62, capable of pivoting around the axis 65, fixed relative to the first re-orientable element 40. The rod 66 is preferably aligned with the rotation axis B.

Figure 2:
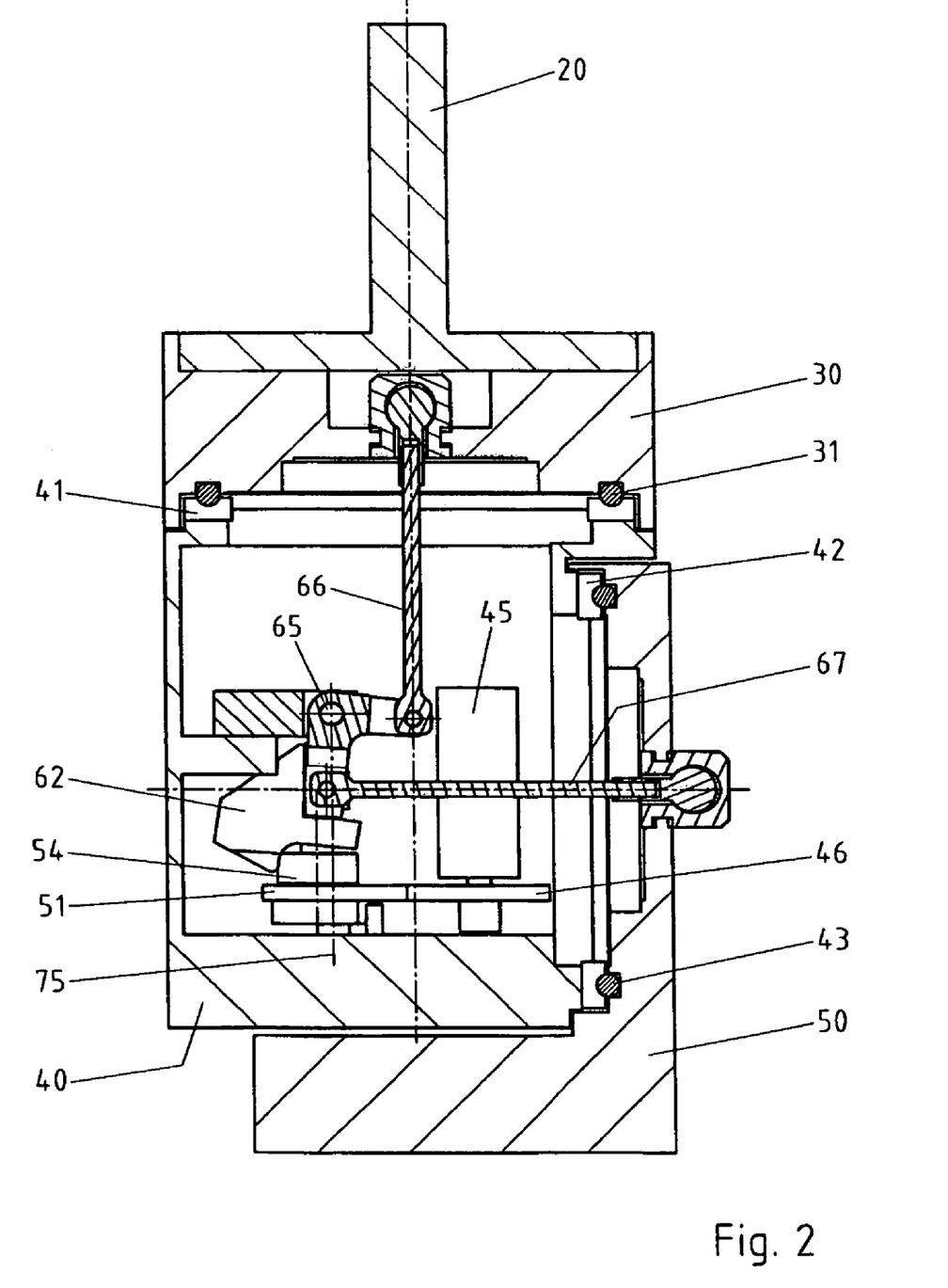
FIG. 2, a cross section of the inventive measuring head in locked position.

In the locked state of FIG. 2, the rod 66 is tensioned and pulls the first re-orientable element 40 upwards so that the indexing pins 41 engage with the balls 31 of the support 30. In this state, any rotation around the axis B is impossible and the re-orientable element 40 is locked in one of the indexed positions.

The force exerted by the rod 66 is applied centrally relatively to the contact points between the balls 31 and the pins 41, and is oriented along the axis B. In this manner, one achieves an equal distribution of the contact forces between the balls 31 and the pins 341 for a maximum indexing accuracy.

The second re-orientable element 50 is also held against the first re-orientable element 40 by the tension of the horizontal rod 67 aligned with the axis A. The rod 67 is articulated on the one hand relatively to the re-orientable element 50 and on the other hand relatively to the lever 62. A second set of balls 43 and of pins 42, placed between the first and second re-orientable elements, allows the rotation of the second re-orientable element 50 to be locked in an indexed position.

Optionally, the rods 66 and 67 comprise elastic elements (not represented), for example metallic springs, to ensure a constant indexing force between the pins 41, 42 and the balls 31, 43. In equivalent manner, elastic elements could be included in the lever 62 or in the first and second re-orientable elements.

Figure 9:
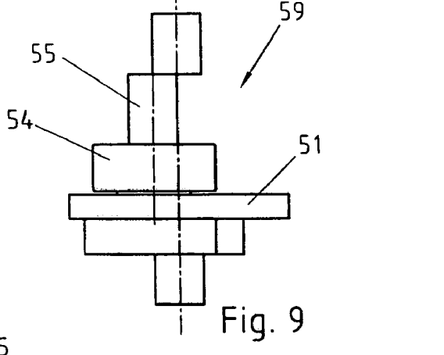
FIG. 9, a detailed view of a crankshaft included in the actuator of FIGS. 5–8.

With reference to FIGS. 5–9, the position of the lever 62 is determined by the crankshaft 59, represented in detail in FIG. 9, driven in rotation around the axis 75 by the electric motor 45 and the dented wheels 46, 51. In equivalent manner, the crankshaft 59 could be driven directly by a motor placed on the same axis 75 of the crankshaft 59 or by any mechanical transmission, for example by a system of pulleys.

One arm of the lever 62 comprises a fork whose two branches 63 and 64 contact the two opposite sides of the crank pin 55 of the crankshaft 59, so as to move the lever 62 from the locked position to the unlocked position when the crankshaft 59 turns by 180°. Optionally, a ball bearing is interposed between the crank pin 55 and the fork in order to reduce friction during locking and/or unlocking. In the embodiment illustrated in the figures, a bearing 54 is provided only to correspond to the branch 63 that transmits the locking force. To correspond to the other branch 64 of the fork, responsible for unlocking, the efforts required are less and a simple antifriction bearing can be used.

The rotation of the crankshaft 59 around the axis 75 is limited to a rotation angle slightly greater than 180° by the sector 53 and the pin 55 united with the first re-orientable element 40. The stop positions of the pin 55 against the extremities of the sector 53 are disposed so as to overtake the points of equilibrium and thus to define stable resting positions corresponding respectively to the locked state and to the unlocked state.

Figure 3:
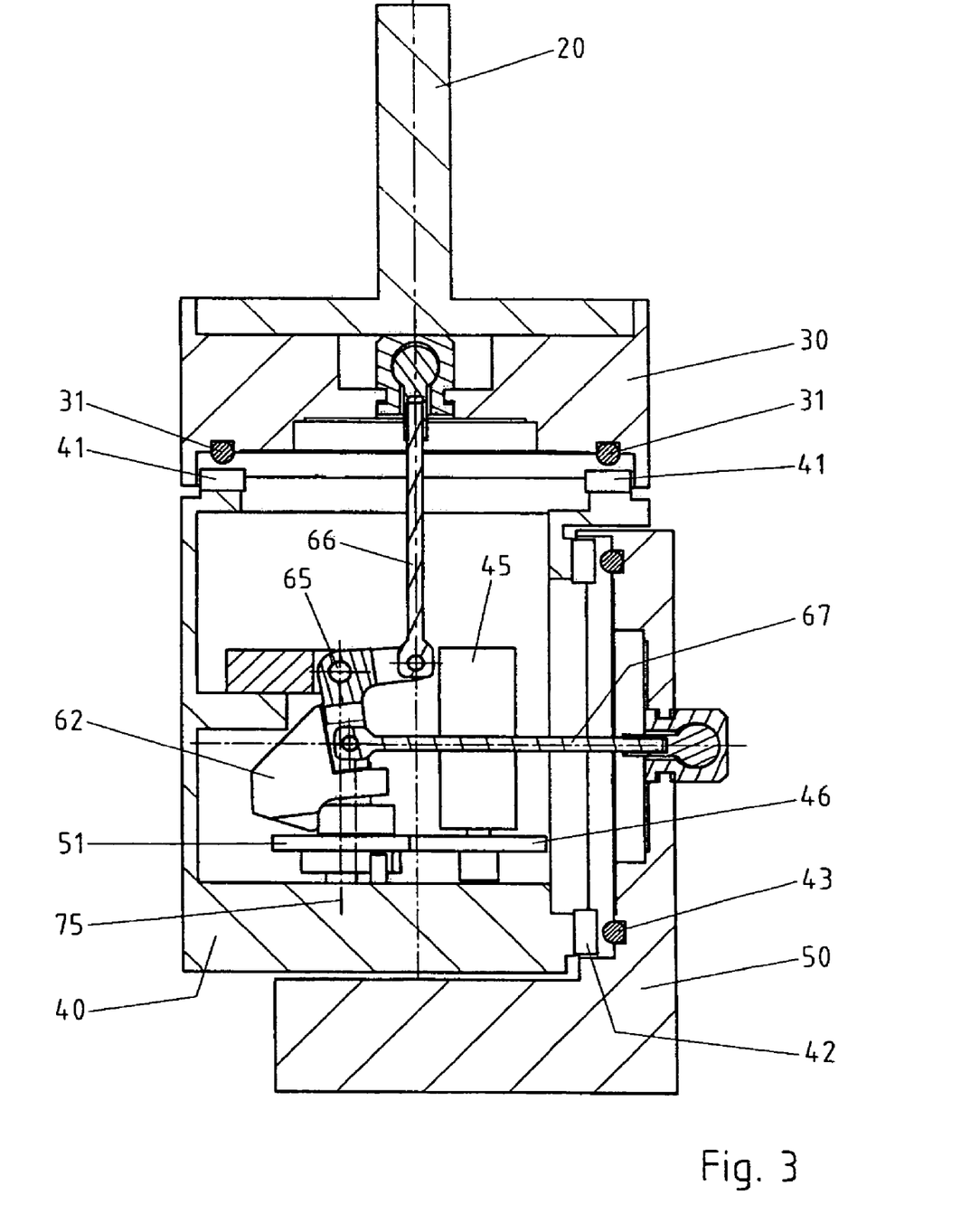
FIG. 3, a cross section of the inventive measuring head in unlocked position.
Figure 4:
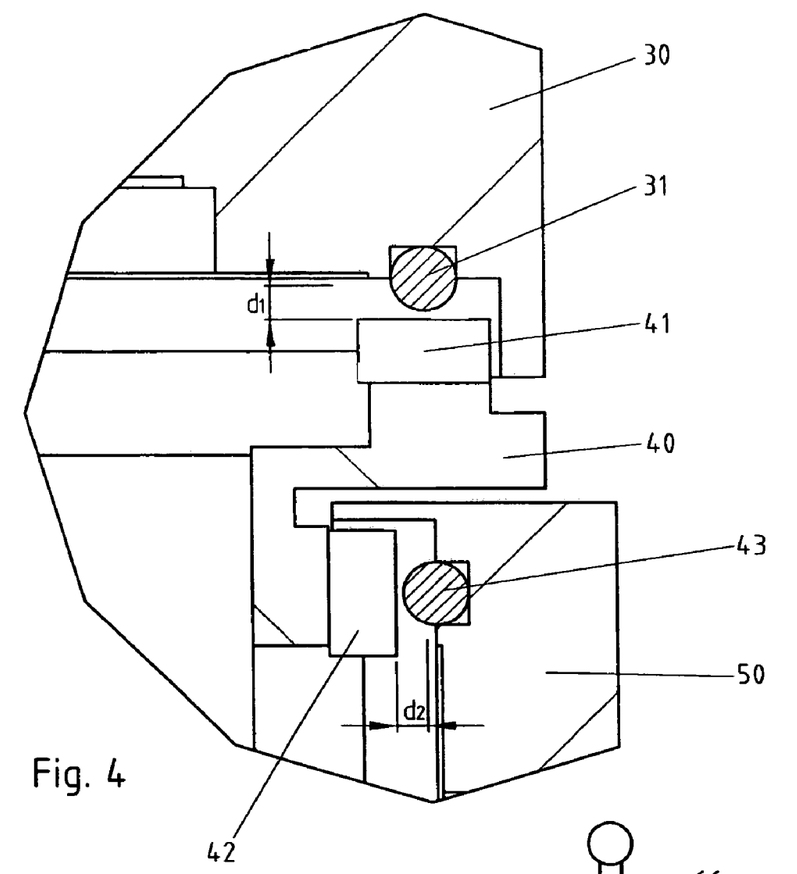
FIG. 4, a detail of the locking/unlocking mechanism of the inventive measuring head.
Figure 5:
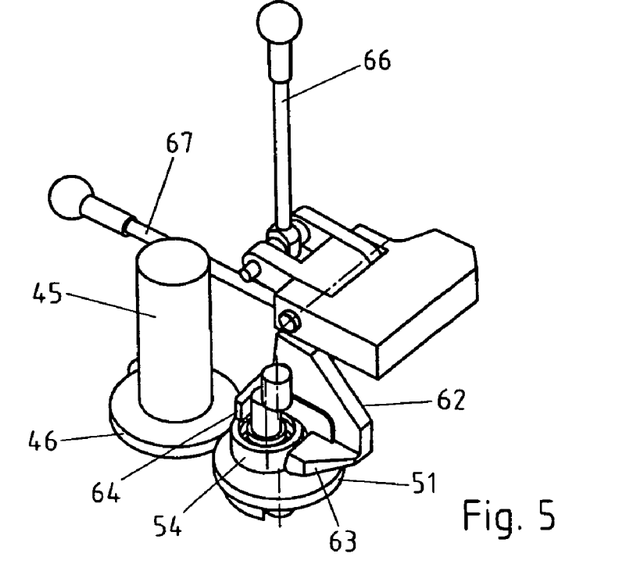
FIG. 5 to 8, different views of the actuator responsible for the locking and unlocking according to one aspect of the invention.
Figure 6:
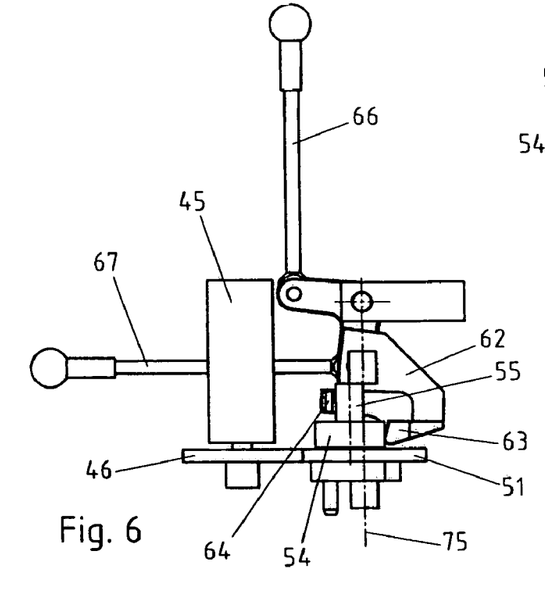
Figures 7, 8:
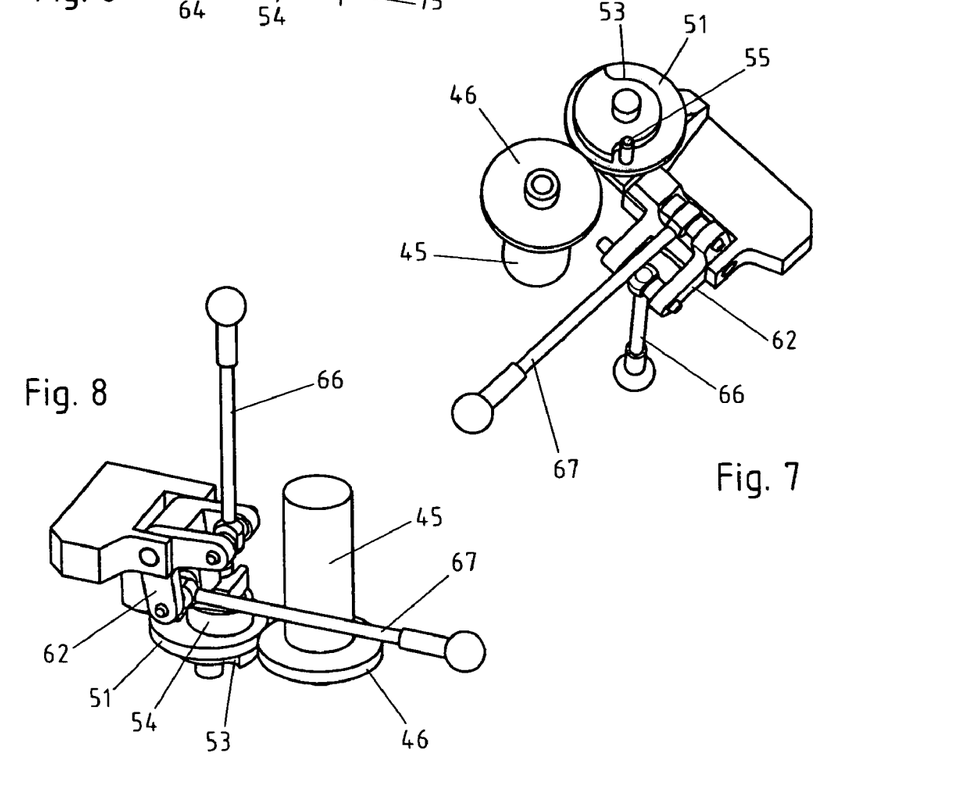

The FIGS. 3 and 4 represent the measuring head according to the invention in its unlocked state. In this case, the lever 62 is inclined and the rods 66 and 67 press on the support element 30 respectively on the second re-orientable element 50 so as to move the indexing elements 31, 41 respectively 42, 43 apart by a predetermined distance d1, respectively d2.

In a variant embodiment, the rods 66 and 67 could be driven by a pinion/rack unit.

The moving apart and the closing of the indexing surfaces take place thanks to the double action of the rods 66 and 67 which is independent of the direction of the weight force and of the inertia forces, and without springs or elastic elements having to be used. The inventive mechanism can thus also ensure a reliable and fast functioning whatever the orientation of the measuring head.

In unlocked position, the rotation around the two axes A and B is ensured by servomotors (not represented), controlled by the software of the measuring machine, or by other equivalent automatic actuators.

The embodiment described here comprises a single actuator for locking and unlocking the two axes A and B simultaneously. The invention however also includes variants in which each rotation axis is locked and unlocked by an independent actuator.

In one embodiment, the inventive measuring head comprises only a single rotation axis, for example a horizontal axis A.

Figure 10:
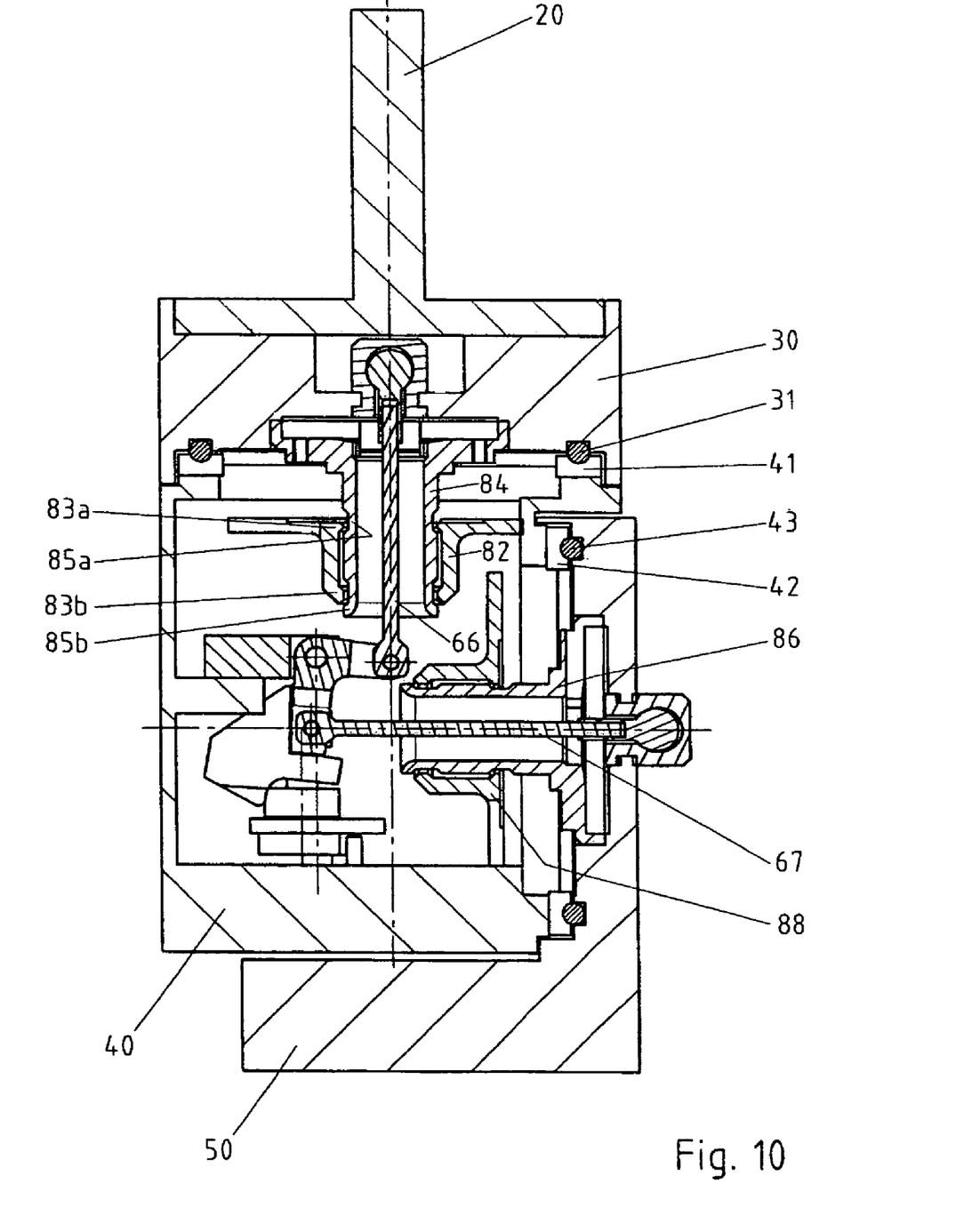
FIGS. 10 and 11, the position of the bearings of the measuring head's re-orientable elements in locked resp. unlocked position.

With reference to FIG. 10, representing the guiding system in locked position, the first re-orientable element 40 is provided with a guiding bushing 82 into which the shaft 84, united with the support element 30, engages. The surface of the shaft 84 has protuberances 85a, 85b separated by undercuts on which the diameter of the shaft 84 is reduced relatively to the maximum diameter of the protuberances 85a, 85b.

In the same manner, the inner surface of the bushing 82 has protuberances 83a, 83b separated by undercuts having a diameter greater than the inner diameter of the protuberances 83a and 83b.

In the locked position of FIG. 10, the protuberances 83a and 83b face the undercuts of the shaft 84. There is thus no contact between the guiding bushing 82 and the fixed shaft 84 that could impair the indexing accuracy.

Figure 11:
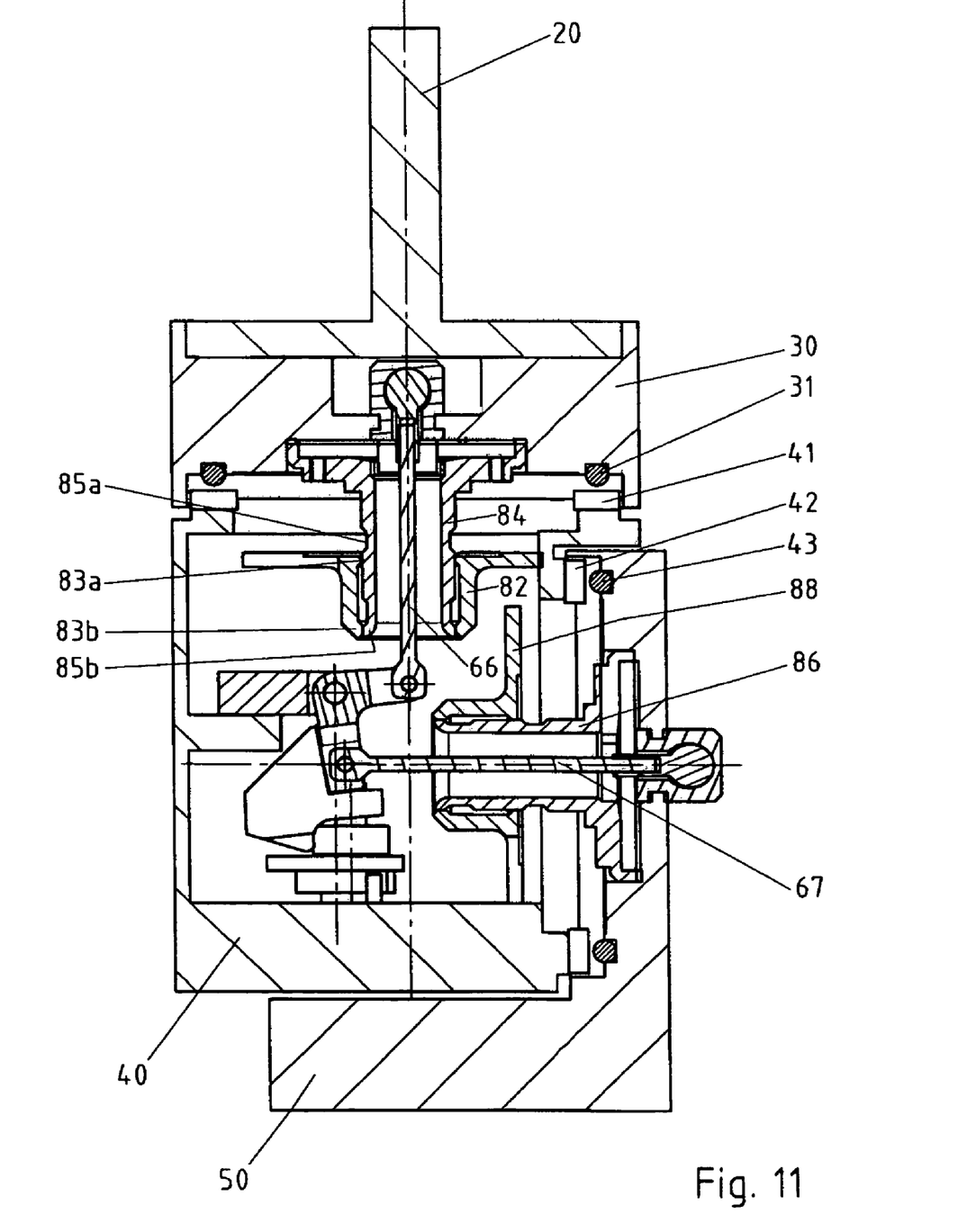

In the unlocked position of FIG. 11, the first re-orientable element 40 is displaced axially along the axis B so as to move the balls 31 and the pins 41 apart. In this position, the protuberances 83a and 83b are juxtaposed over the protuberances 85a and 85b so as to support the rotation of the re-orientable element 40 around the axis B. Preferably, the bushing 82 and the shaft 84 each comprise two protuberances at a distance along the direction of the rotation axis to guide the rotation in optimal manner.

Thanks to the absence of contact between the guiding elements 82 and 84 in locked position, the latter's diameter can be considerable and the play between the bushing and the shaft can be essentially zero or negligible in unlocked position. In this manner, the probe feeler's position during rotation is fully determined.

Figures 12, 13, 14, 15:
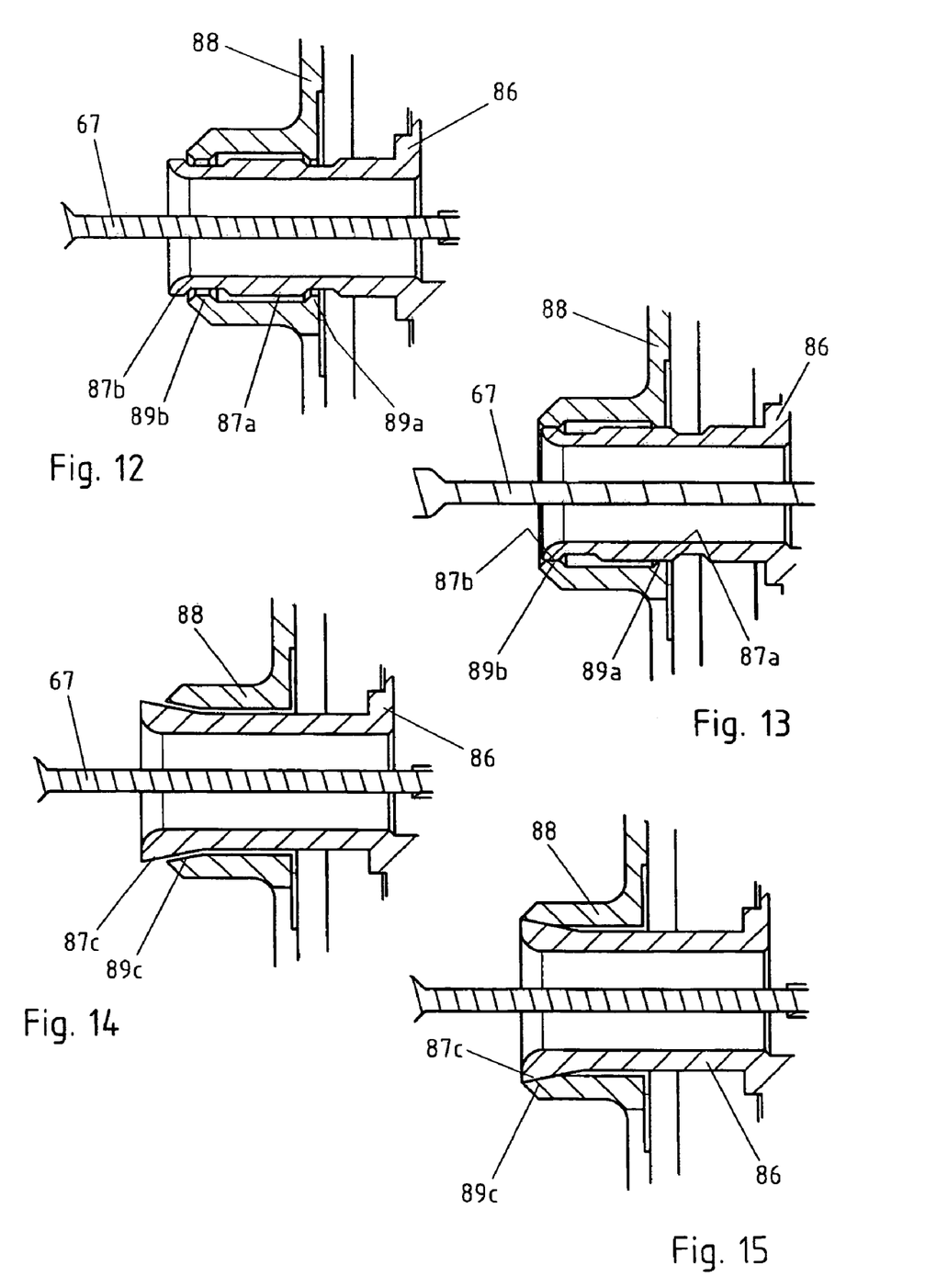
FIGS. 12 and 13, details of FIG. 10 resp. of FIG. 11.
FIGS. 14 and 15, another embodiment of the invention.

The second horizontal rotation axis A is provided with a guiding mechanism visible in FIGS. 12 and 13, similar to that of the first vertical axis B. The guiding bushing 88 of the second axis bears two protuberances 89a and 89b, whilst the shaft 86 comprises the two protuberances 87a and 87b.

In locked position, visible in FIG. 12, the protuberances 89a, 89b of the bushing 88 and the protuberances 87a and 87b of the shaft 86 are shifted in relation to one another. In this manner, there is no contact between the bushing 88 and the shaft 86 that could impair the indexing accuracy.

In the unlocked position of FIG. 13, the protuberances 89a, 89b of the bushing 88 and the protuberances 87a and 87b of the shaft 86 are juxtaposed and form two bearings to guide the rotation of the second re-orientable element 50 around the axis A.

In a variant embodiment of the invention represented in FIGS. 14 and 15, the shaft 86 and the bushing 88 are provided with coaxial conical guiding surfaces 87c and 89c. In the locked arrangement of FIG. 14, there is no contact between the guiding bushing 88 and the shaft 86. In the unlocked position, represented in FIG. 15, the conical surfaces 87c and 89c stand in contact and guide the rotation of the second re-orientable element 50 around the axis A.

The invention claimed is:

1. Orientable measuring head for orienting a probe feeler relatively to a measuring apparatus, including:
    a support element;
    a first re-orientable element capable of sliding in the direction of a first axis between a locked position and an unlocked position;
    a first guiding organ connected with said support element;
    a second guiding organ connected with said first re-orientable element;
    wherein said first and second guiding organs do not touch when said re-orientable element is in locked position;
    wherein said first guiding organ supports said second guiding organ so as to allow said re-orientable element to rotate around said axis relatively to said support element when said re-orientable element is in said unlocked position.

2. The measuring head of claim 1, wherein one of said first and second guiding organs is a bushing and the other is a shaft.

3. The measuring head of claim 2, including:
    a plurality of mobile positioning elements united with said first re-orientable element;
    a plurality of fixed positioning elements united with said support element and capable of engaging with said mobile positioning elements to define a plurality of predetermined orientations of said first re-orientable element relatively to said fixed element.

4. The measuring head of claim 2, including a rotation actuator for turning said first re-orientable element relatively to said support element when said first re-orientable element is in unlocked position.

5. The measuring head of claim 2, wherein the coupling between said first and second guiding organs is essentially free of play when said first re-orientable element is in unlocked position.

6. The measuring head of claim 1, wherein said guiding organs have on their supporting surfaces protuberances, said protuberances being shifted in relation to one another when said re-orientable element is in locked position and juxtaposed when said re-orientable element is in unlocked position.

7. The measuring head of claim 6, wherein said guiding organs each have at least two protuberances at a distance along the direction of the axis.

8. The measuring head of claim 1, including:
- a second re-orientable element capable of sliding, relatively to said first re-orientable element in the direction of a second axis between a locked position and an unlocked position;
- a third guiding organ connected to said first re-orientable element;
- a fourth guiding organ connected to said second re-orientable element;
- wherein said third and fourth guiding organs do not touch when said second re-orientable element is in locked position;
- wherein said third guiding organ supports said fourth guiding organ so as to allow said second re-orientable to rotate around said second axis relatively to said re-orientable element when said second re-orientable element is in said unlocked position.

9. The measuring head of claim 8, wherein said first axis and second axis are essentially orthogonal.

* * * * *